(12) United States Patent
Cheng et al.

(10) Patent No.: US 7,746,516 B2
(45) Date of Patent: *Jun. 29, 2010

(54) IMAGE SCANNING

(76) Inventors: Chung-Wei Cheng, 1F., No. 799-1, Junghua Rd., Hsinchu (TW); Stone Cheng, No. 187, Pingdong Rd., Tzguan Shiang, Kaohsiung (TW)

( * ) Notice: Subject to any disclaimer, the term of this patent is extended or adjusted under 35 U.S.C. 154(b) by 847 days.

This patent is subject to a terminal disclaimer.

(21) Appl. No.: 11/512,668

(22) Filed: Aug. 29, 2006

(65) Prior Publication Data

US 2007/0030540 A1 Feb. 8, 2007

Related U.S. Application Data

(63) Continuation of application No. 10/226,199, filed on Aug. 23, 2002, now Pat. No. 7,123,387.

(51) Int. Cl.
*H04N 1/04* (2006.01)
*G03F 3/10* (2006.01)
*G06K 9/00* (2006.01)

(52) U.S. Cl. ............. 358/474; 358/527; 358/444; 382/318; 382/319

(58) Field of Classification Search .......... 358/474, 358/444, 442, 452, 453, 527, 505, 518–524; 382/318, 319, 312, 274

See application file for complete search history.

(56) References Cited

U.S. PATENT DOCUMENTS

| 5,444,544 | A  | 8/1995  | Oka et al.      |
|-----------|----|---------|-----------------|
| 5,962,205 | A  | 10/1999 | Arakawa et al.  |
| 6,542,173 | B1 | 4/2003  | Buckley         |
| 6,717,585 | B2 | 4/2004  | Kagawa et al.   |
| 6,798,530 | B1 | 9/2004  | Buckley et al.  |
| 6,819,439 | B2 | 11/2004 | Hayashi et al.  |
| 6,901,162 | B2 | 5/2005  | Kagawa et al.   |

FOREIGN PATENT DOCUMENTS

| CN | 1334545    | 2/2002 |
|----|------------|--------|
| JP | 2001189860 | 7/2001 |

*Primary Examiner*—Cheukfan Lee
(74) *Attorney, Agent, or Firm*—Stolowitz Ford Cowger LLP

(57) ABSTRACT

An image scanning method includes pre-scanning a first document to generate a first original image according to the first document; adjusting parameter settings of the first original image to generate and store a plurality of pre-view images corresponding to different sets of parameters; pre-scanning a second document to generate a second original image according to the second document; and scanning the second document to generate a plurality of scanning images according to the different sets of parameters of the pre-view images. The parameter settings of the first original image include brightness, shadow, and contrast settings.

22 Claims, 2 Drawing Sheets

IMAGE SCANNING

CROSS-REFERENCE TO RELATED APPLICATION(S)

The present application is a continuation of U.S. application Ser. No. 10/226,199, filed Aug. 23, 2002, and issued as U.S. Pat. No. 7,123,387. The entire disclosure of prior application Ser. No. 10/226,199 is considered as being part of the disclosure of the present application and is hereby incorporated by reference herein in its entirety.

BACKGROUND

1. Field of the Invention

The invention relates in general to image scanning and outputting.

2. Description of the Related Art

Image scanners are known as essential devices in a variety of personal computer peripherals. Referring to FIG. 1, a flow chart of a conventional image scanning method is shown. The conventional scanning method includes following approaches. In the first step 110, a driver is actuated. Accordingly, in the step 120, a document to be scanned on a scan flat bed is pre-scanned for one time by a scanning module driven by the driver to generate an original image. Subsequently, in the step 130, parameter settings of the original image, such as brightness, shadow, and contrast settings, are adjusted by the user to generate a pre-view image. In the step 140, the document to be scanned is then scanned according to the pre-view image by the image scanner. Lastly, in the step 150, the image scanning process is completed to generate a scanned image.

As described above, in the conventional image scanning method, the document to be scanned is pre-scanned firstly to generate an original image. A preview image is then generated by adjusting parameter settings of the original image, such as brightness, shadow, and contrast setting. Lastly, the document to be scanned is scanned to generate the scanning image with the set of parameters of the pre-view image and complete the scanning process.

However, only one pre-view image with the adjusted parameter setting and only one set of parameters corresponding to the pre-view image are stored after the pre-scanning operation. When the only set of parameters is applied to the original image generated by pre-scanning another document to be scanned, only one pre-view image of another document to be scanned with the only set of parameters will be generated.

Consequently, the conventional image scanning method has the following disadvantages:

1. The scanning time is too long. The parameter settings of the previous document to be scanned fail to be applied to a new document to be scanned for outputting several scanning images with the same set of parameters. Therefore, the parameter settings should be adjusted again whenever a new document is to be scanned, which increases the scanning time.

2. It is easy to make mistakes during the operation of adjusting parameter settings again. To adjust parameter settings again not only complicates the scanning process but also makes the new adjusted parameter settings inconsistent with the parameter settings of the previous documents easily.

SUMMARY OF THE INVENTION

It is therefore an object of the invention to provide an image scanning method, so that the scanning time can be shortened without the need of adjusting the parameter settings again.

According to the objective of the invention, an image scanning method for an image scanner is provided. The image scanning method includes pre-scanning a first document to generate a first original image according to the first document; adjusting parameter settings of the first original image to generate and store a plurality of pre-view images corresponding to different sets of parameters; pre-scanning a second document to generate a second original image according to the second document; and scanning the second document to generate a plurality of scanning images with different sets of parameters of the pre-view images. The parameter settings of the first original image include brightness, shadow, and contrast settings.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
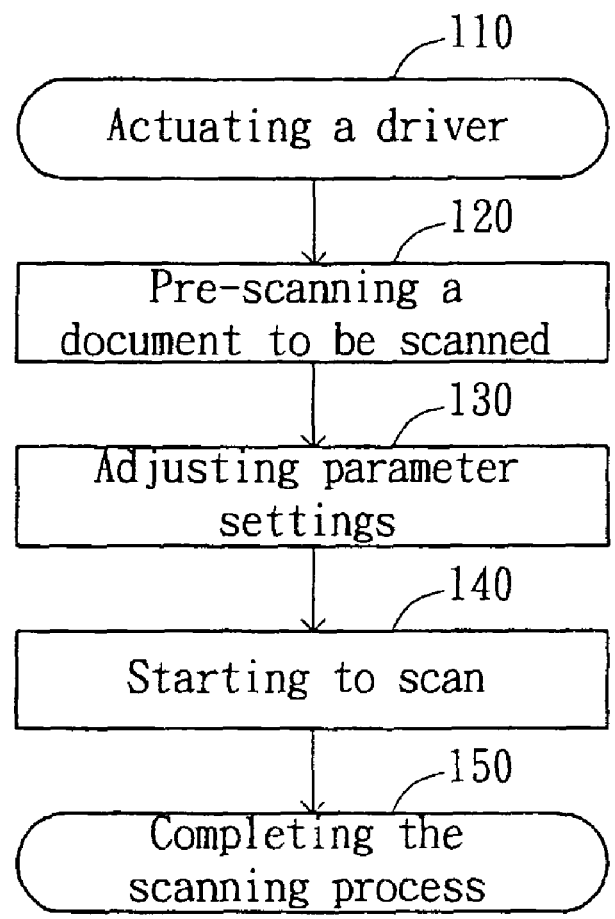
FIG. 1 is a flow chart showing a conventional image scanning method.
Figure 2:
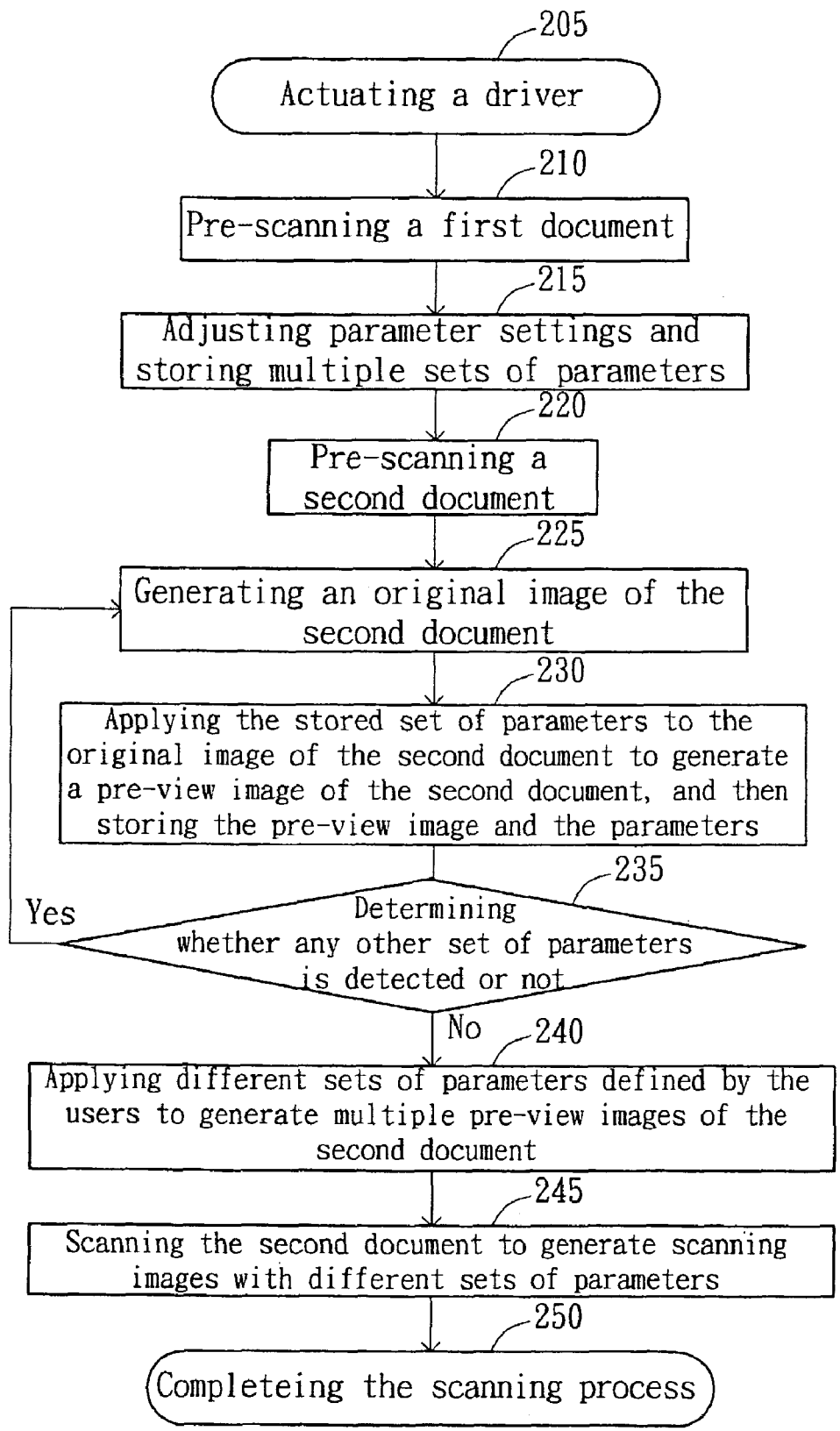
FIG. 2 is a flow chart of the image scanning method according to a preferred embodiment of the invention.

Referring to FIG. 2, a flow chart of the image scanning method according to a preferred embodiment of the invention is shown, which includes the following procedures. In the first step 205, a driver is actuated. Accordingly, in the step 210, a first document to be scanned on a scan flat bed is pre-scanned for one time by a scanning module driven by the driver to generate an original image of the first document. Subsequently, in the step 215, parameter settings such as brightness, shadow, and contrast settings are adjusted according to the original image of the first document by the user to generate multiple pre-view images and then multiple sets of parameters are stored. In the step 220, a second document to be scanned on the scan flat bed is pre-scanned for one time and an original image of the second document is generated in the step 225. Furthermore, in the step 230, the stored set of parameters is applied to the original image of the second document to generate a pre-view image of the second document, and then the pre-view image and the set of parameters are stored. In the step 235, the image scanner determines whether any other set of parameters is detected or not. If not, the method proceeds to the step 240. If any other set of parameters is detected, the method goes back to the step 225. In the step 240, different sets of parameters defined by the user are applied to generate multiple preview images of the second document. In the step 245, the second document is scanned according to the parameter settings of these pre-view images of the second document by the image scanner. In the last step 250, the pre-view images with different sets of parameters of the second document are used in the image scanning to generate scanning images with different sets of parameters and the scanning process is completed.

It is noticed that all the parameter settings such as brightness, shadow, and contrast settings of the pre-view images according to the second document can be obtained from the parameter settings of the pre-view images according to the first document. The main spirit of the image scanning method according to the invention is capable of storing multiple pre-view images and multiple corresponding sets of parameters at a time. Moreover, the stored parameters can be applied again to the original image generated by pre-scanning a new document to be scanned.

The method according to the invention, all the original images and the preview images can be displayed by a display interface. The display interface can be a display window.

In the preferred embodiment described herein, the advantages of according to the invention are as below:

1. The scanning time is shortened. The parameter settings according to the previous documents can be applied again to a new document to be scanned for outputting several scanning images with the same set of parameter settings, so that the scanning time can be shortened.

2. The parameter settings for a new document to be scanned need not to be adjusted again and therefore no mistake will be made. Not only the scanning process can be simplified but also the new adjusted parameter settings will be consistent with the parameter settings of the previous documents.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method, comprising:
pre-scanning a first document to generate an original image of the first document;
applying a set of parameters to the original image of the first document to generate a pre-view image corresponding to the set of parameters;
pre-scanning a second document to generate an original image of the second document;
applying the set of parameters to the original image of the second document to generate a pre-view image of the second document; and
generating a scanned image of the second document based, at least in part, on the pre-view image of the second document.

2. The method according to claim 1, wherein the set of parameters comprises at least one of a brightness, a shadow, and a contrast.

3. The method according to claim 1, further comprising displaying the generated scanned image of the second document.

4. The method according to claim 1, further comprising storing the set of parameters.

5. The method of claim 1, wherein applying the set of parameters comprises automatically applying the set of parameters.

6. An apparatus, comprising:
means for pre-scanning a first document to generate an original image of the first document;
means for generating a pre-view image of the first document using a set of parameters;
means for pre-scanning a second document to generate an original image of the second document; and
means for generating a scanned image of the second document based at least in part on the set of parameters of the pre-view image.

7. The apparatus according to claim 6, wherein the set of parameters comprises at least one of a brightness, a shadow, and a contrast.

8. The apparatus according to claim 6, further comprising:
means for storing the set of parameters; and
means for displaying the original image of the first document, the pre-view image, and the original image of the second document.

9. The apparatus of claim 6, wherein the means for generating the scanned image of the second document comprises means for automatically generating the scanned image of the second document.

10. An image scanner, comprising:
a scanning module configured to:
pre-scan a first document to generate an original image of the first document; and
pre-scan a second document to generate an original image of the second document; and
an image processing device configured to:
apply a set of parameters to the original image of the first document to generate a pre-view image corresponding to the set of parameters; and
generate a scanned image of the second document based, at least in part, on the set of parameters.

11. The image scanner according to claim 10, wherein the set of parameters comprises at least one of a brightness, a shadow, and a contrast.

12. The image scanner of claim 10, wherein generating the scanned image of the second document comprises automatically generating the scanned image of the second document.

13. An apparatus, comprising:
means for pre-scanning a first document to generate an original image of the first document;
means for adjusting parameter settings of the original image of the first document to generate a set of parameters;
means for pre-scanning a second document to generate an original image of the second document; and
means for applying the set of parameters to the original image of the second document to generate a scanned image of the second document.

14. The apparatus according to claim 13, wherein the set of parameters comprises at least one of a brightness, a shadow, and a contrast.

15. The apparatus according to claim 13, further comprising means for displaying the scanned image of the second document.

16. The apparatus according to claim 13, further comprising means for storing the set of parameters.

17. The apparatus of 13, wherein the means for applying the set of parameters comprises means for automatically applying the set of parameters.

18. An image scanning method for an image scanner, the method comprising:
scanning a first document with a scanning module driven by a scanning driver;
generating an image of the first document;
displaying the generated image of the first document;
receiving and storing adjusted parameter settings for the first document;
scanning a second document with the scanning module;
generating an image of the second document by applying the adjusted parameter settings to the second document; and
displaying the second document image.

19. The method according to claim 18, wherein the adjusted parameter settings comprise a brightness, a shadow, and a contrast setting.

20. The method according to claim 18, wherein the images are displayed by a display interface.

21. The method according to claim 20, wherein the display interface is a display window.

22. The method according to claim 18, further comprising receiving and storing adjusted parameter settings for the second document for application to a subsequent document.

* * * * *

UNITED STATES PATENT AND TRADEMARK OFFICE
CERTIFICATE OF CORRECTION

PATENT NO. : 7,746,516 B2  Page 1 of 1
APPLICATION NO. : 11/512668
DATED : June 29, 2010
INVENTOR(S) : Cheng et al.

It is certified that error appears in the above-identified patent and that said Letters Patent is hereby corrected as shown below:

At section (76), line 3, please replace "Pingdong" with --Pingdeng--.
At column 4, line 50, please replace "of 13," with --of claim 13,--.

Signed and Sealed this

Ninth Day of November, 2010

David J. Kappos
*Director of the United States Patent and Trademark Office*